US012450123B2

(12) United States Patent
George et al.

(10) Patent No.: US 12,450,123 B2
(45) Date of Patent: Oct. 21, 2025

(54) SNAPSHOT COPY OPERATION TO COPY A SNAPSHOT FROM SOURCE ENDPOINT TO DESTINATION ENDPOINT

(71) Applicant: NetApp Inc., San Jose, CA (US)

(72) Inventors: Tijin George, Sunnyvale, CA (US); Sharankumar Yelheri, Santa Clara, CA (US); Sanhita Praveen Dhavale, San Jose, CA (US); Chuyi Wei, San Jose, CA (US); Ricardo Sanchez Aguilera, San Francisco, CA (US)

(73) Assignee: NetApp, Inc., San Jose, CA (US)

( * ) Notice: Subject to any disclaimer, the term of this patent is extended or adjusted under 35 U.S.C. 154(b) by 200 days.

(21) Appl. No.: 17/731,745

(22) Filed: Apr. 28, 2022

(65) Prior Publication Data

US 2023/0133533 A1 May 4, 2023

Related U.S. Application Data

(60) Provisional application No. 63/273,467, filed on Oct. 29, 2021.

(51) Int. Cl.
*G06F 16/00* (2019.01)
*G06F 7/00* (2006.01)
*G06F 11/14* (2006.01)
*G06F 16/11* (2019.01)

(52) U.S. Cl.
CPC ...... *G06F 11/1451* (2013.01); *G06F 11/1464* (2013.01); *G06F 16/128* (2019.01); *G06F 2201/84* (2013.01)

(58) Field of Classification Search
CPC ............... G06F 16/128; G06F 11/1451; G06F 11/1464; G06F 2201/84
USPC ........................................................ 707/646
See application file for complete search history.

(56) References Cited

U.S. PATENT DOCUMENTS

| 11,550,816 B1* | 1/2023 | Quan ...................... G06F 3/065 |
| 11,940,881 B1* | 3/2024 | Srivastava .......... G06F 11/1453 |
| 2006/0184587 A1 | 8/2006 | Federwisch |
| 2012/0124013 A1 | 5/2012 | Provenzano |
| 2015/0019556 A1* | 1/2015 | Provenzano ............ G06F 3/065 707/737 |
| 2015/0066858 A1 | 3/2015 | Sabdar et al. |

(Continued)

OTHER PUBLICATIONS

Int. Search Report/Written Opinion cited in PCT Application No. PCT/CN2022/047690 dated Feb. 10, 2023, 16 pgs.

(Continued)

*Primary Examiner* — Raquel Perez-Arroyo
(74) *Attorney, Agent, or Firm* — Cooper Legal Group, LLC

(57) ABSTRACT

Techniques are provided for implementing a snapshot copy operation between endpoints. One or more snapshots (e.g., snapshots of an on-premise volume) is stored within a source endpoint, such as a source bucket of an object store. A post operation is executed to copy objects comprising snapshot data of a snapshot from the source endpoint to a destination endpoint. A get operation and a tracking object such as a cookie is used to track progress of copying the objects from the source endpoint to the destination endpoint. The tracking object is used to restart the copying of the objects from a point where the copying left off (e.g., in the event there is a failure) without having to restart from the beginning.

20 Claims, 10 Drawing Sheets

(56) References Cited

U.S. PATENT DOCUMENTS

2018/0081577 A1* 3/2018 Matthews .................. G06F 5/06
2023/0046983 A1* 2/2023 Gunasekaran ........ G06F 3/0659

OTHER PUBLICATIONS

International Preliminary Report on Patentability for Application No. PCT/US2022/047690, mailed on May 10, 2024, 11 pages.

* cited by examiner

SNAPSHOT COPY OPERATION TO COPY A SNAPSHOT FROM SOURCE ENDPOINT TO DESTINATION ENDPOINT

RELATED APPLICATIONS

This application claims priority to U.S. Provisional Patent Application, titled "SNAPSHOT COPY OPERATION BETWEEN ENDPOINTS", filed on Oct. 29, 2021 and accorded Application No.: 63/273,467, which is incorporated herein by reference.

BACKGROUND

A device such as a node may store data on behalf of a client within a volume. The volume may be stored within local storage accessible to the device, such as within on-premise storage. The device may implement storage management functions for the client. For example, the device may create backups of the volume by creating snapshots of the volume. A snapshot of the volume may capture a point-in-time representation of a state of the volume. The device may use the snapshot in order to restore the volume back to a state of the volume at which the snapshot was created.

DETAILED DESCRIPTION

Figure 1:
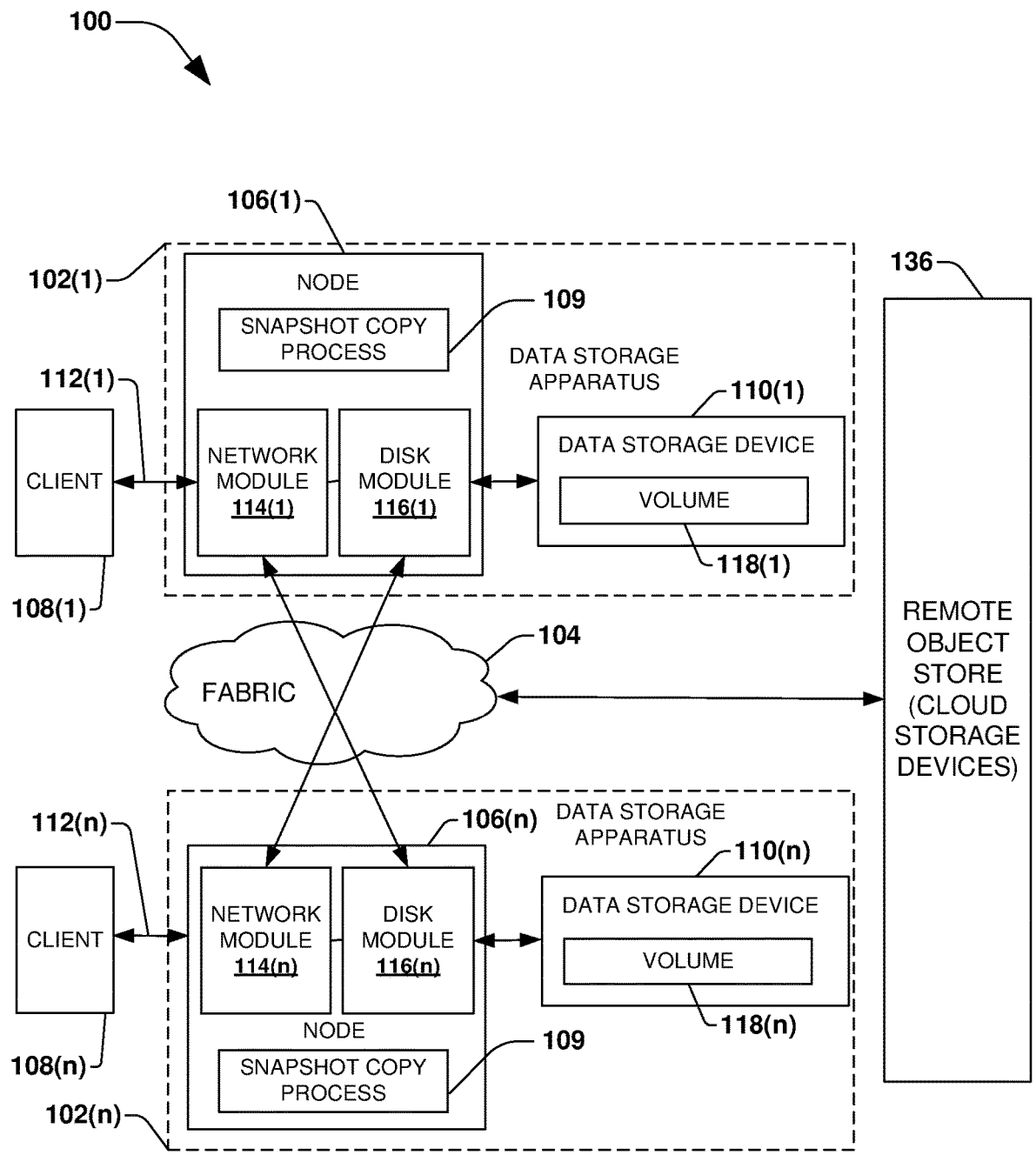
FIG. 1 is a block diagram illustrating an example computing environment in which an embodiment of the invention is implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A storage system provides a client with storage functionality, such as the ability to store data within a volume that is stored on-premise or elsewhere. The storage system provides backup functionality for the volume, such as the ability to create snapshots of the volume as point in time representations of the volume, which can be used to restore the volume to state captured by a snapshot. The storage system can be implemented through a node, a server, a container hosted within a container orchestration platform such as Kubernetes, serverless threads, hardware, software, logical constructs, or combinations thereof. The storage system is configured to store the snapshots into an object store, such as a cloud computing environment. For example, the storage system stores snapshot data of the snapshots into objects, and stores the objects to the object store at an endpoint such as a storage bucket. The objects are formatted according to an object format that represents snapshots as a tree structure. An object comprises snapshot data of one or more snapshots, and snapshot data of a snapshot is stored across multiple objects. This makes the performance of snapshot operations such as snapshot copy operations non-trivial because snapshot data of a snapshot is spread across multiple objects that also comprise snapshot data of other snapshots. Also, the object store provides copy functionality for objects. However, this copy functionally copies the objects in any order, which makes pausing and resuming a copy operation or resuming after a failure non-trivial because there is a lack of information indicative of what objects have already been copied and what operations have not been copied.

Accordingly, as provided herein, a snapshot copy operation is implemented by a snapshot copy process to copy a snapshot from a source endpoint to a destination endpoint in manner where the snapshot copy operation is resumable. In some embodiments, the snapshot copy operation is implemented to copy any number of snapshots from the source endpoint to the destination endpoint, such as to copy snapshots from a source bucket (source endpoint) to a destination bucket (destination endpoint) of an object store so that the snapshots at the destination bucket mirror snapshots at the source bucket at a particular point in time. In some embodiments, the snapshot copy operation is implemented by one or more work threads of a worker node hosting a container within which a storage system is being executed (e.g., the storage system is hosted within a container in a Kubernetes cluster of worker nodes).

A post operation is triggered to initiate the copying of objects comprising snapshot data of the snapshot from the source endpoint to the destination endpoint. As part of facilitating the snapshot copy operation, an initialization stage is performed to identify states of snapshots at the destination endpoint. States of a snapshot is tracked using a state machine or other state tracking mechanism. The states include a delete cleanup state indicating that a metadata object for the snapshot (e.g., a metadata object indicating which objects comprise snapshot data of the snapshot; a root object; a snapinfo object; or other metadata or high level root objects of a tree structure used to represent the snapshot according to an object format) is to be created at the destination endpoint. The states include a deleted sate indicating that the metadata object has been created at the destination endpoint. The states may include a transferred state indicating that the copying of the snapshot to the destination endpoint is complete. If this is the first snapshot being copied to the destination endpoint, then there is no state information at the destination endpoint.

During a metadata setup stage of the snapshot copy operation, a determination as to whether a root object and/or snapinfo object for the snapshot exist at the destination endpoint. If these objects do not exist (e.g., this is the first time the snapshot is being copied to the destination endpoint), then the objects are constructed at the destination endpoint. An entry is created for the snapshot, and the entry is marked with a delete cleanup state. A metadata object (e.g., a GC object) is created at the destination endpoint for the snapshot. The metadata object may indicate which objects comprises snapshot data of the snapshot. Once the metadata object is created, the state of the snapshot tracked within the entry is transitioned from the delete cleanup state to a delete state. In some embodiment, these states are tracked so that if there is a failure during the snapshot copy operation, then a delete snapshot API is implemented to clean up objects comprising the partially transferred snapshot data so that garbage collection can correctly reclaim the storage used by the objects.

During a neighbor snapshot identification stage of the snapshot copy operation, neighboring snapshots of the snapshot being copied are identified at the destination endpoint. Snapshots are assigned sequence numbers, which is monotonically increasing numbers. If snapshot (3) is being copied from the source endpoint to the destination endpoint and the destination endpoint comprises snapshot (1), snapshot (4) and snapshot (6), then snapshot (1) is a previous neighboring snapshot and snapshot (4) is a next neighboring snapshot. There is instances where there is no previous neighboring snapshot, a previous neighboring snapshot but no next neighboring snapshot, or no previous neighboring snapshot and no next neighboring snapshot. These instances are handled during a subsequent metadata object diffing stage.

If the snapshot copy operation corresponds to a restart/resume of a prior failed/paused snapshot copy operation, then the snapshot copy operation is associated with a tracking object (e.g., a cookie) comprising progress tracking information, such as a hash corresponding to a previous neighboring snapshot and a next neighboring snapshot taken into account by the prior snapshot copy operation. If the progress tracking information is validated (e.g., the hash corresponds to the snapshot (1) as the previous neighboring snapshot and snapshot (4) as the next neighboring snapshot), then the snapshot copy operation may resume from where the prior snapshot copy operation left off. Thus, the snapshot copy operation may retain the already copied objects comprising snapshot data of the snapshot and may resume processing a next object that was to be copied to the destination endpoint as part of the prior snapshot copy operation. Otherwise, if the progress tracking information is not validated (e.g., a mismatch between the hash and the snapshot (1) as the previous neighboring snapshot and snapshot (4) as the next neighboring snapshot), then the snapshot copy operation is restarted from a beginning point.

During the metadata object diffing stage of the snapshot copy operation, a difference scanner of the storage system may perform a difference operation upon the metadata object of the snapshot and metadata objects of the neighboring snapshots. A metadata object of a snapshot may comprise indicators (e.g., bits of a bitmap such as an object map) that is set to indicate whether objects comprise snapshot data of the snapshot or do not comprise snapshot data of the snapshot. Because the neighboring snapshots have already been transferred to the destination endpoint, objects identified by metadata objects of the neighboring snapshots as comprising snapshot data of the neighboring snapshots may already be present within the destination endpoint. Thus, if the snapshot being copied by the snapshot operation has indicators set to indicate that any of these objects comprises snapshot data of the snapshot, then these objects do not need to be copied from the source endpoint to the destination endpoint because the objects are already present at the destination endpoint. If the difference operation determines that the metadata object for the snapshot has an indicator that an object comprises snapshot data of the snapshot and that metadata objects of the neighboring snapshots have corresponding indicators that the object does not comprise snapshot data of the neighboring snapshots, then the object may not be stored at the destination endpoint and is to be copied from the source endpoint to the destination endpoint. In this way, the difference operation identifies objects comprising snapshot data of the object and not comprising snapshot data of either of the neighboring snapshots by identifying a difference between values of indicators within the metadata objects. Thus, a subsequent copy stage may merely copy objects not already present at the destination endpoint.

During the copy stage of the snapshot copy operation, the objects identified by the difference operation are copied from the source endpoint to the destination endpoint. In some embodiments, a pool of worker threads are used to copy one or more objects at a time as a batch, such as 100 objects in parallel. The objects are copied using get operations to the source endpoint and put operations to the destination endpoint. In some embodiments, an optimized copy operation is performed so that the objects remain within the object store during the optimized copy operation without having to download the objects from the source endpoint and upload the objects to the destination endpoint.

During a copy done stage of the snapshot copy operation, a verification is performed to determine whether the snapshot at the source endpoint is valid. The snapshot is valid if the snapshot has a transferred state, but is invalid if the snapshot has a different state such as a deleted state or a delete cleanup state (e.g., the snapshot could be deleted during the snapshot copy operation). If the snapshot at the source is valid, then the state of the snapshot copied to the destination endpoint is set to the transferred state. In this way, the snapshot is copied from the source endpoint to the destination endpoint.

Various embodiments of the present technology provide for a wide range of technical effects, advantages, and/or improvements to computing systems and components. For example, various embodiments may include one or more of the following technical effects, advantages, and/or improvements: 1) implementation of a snapshot copy process to copy a snapshot from a source endpoint to a destination endpoint by merely copying objects not already present at the destination endpoint in order for improved efficiency compared to copying all objects; 2) safely resume a snapshot copy operation based upon validating a tracking object such as a cookie used to track progress of the snapshot copy operation; 3) implement the snapshot copy operation in a serverless manner such as through a container; 4) copy objects in parallel between any number of endpoints for improved efficiency and parallelism; 5) tracking state information such as within memory with a checkpoint mechanism in an object store provider compatible manner so that a snapshot operation can be paused, terminated, or experience a failure, and then be resumed from where the snapshot operation left off; 6) implement the snapshot copy operation between different cloud providers, between different storage tiers, and/or between different buckets such as from a uncompressed bucket to a compressed bucket for long term storage; and/or 7) perform the snapshot copy operation between endpoints with asymmetric snapshots (e.g., snapshot (1) through (1000) is stored at the destination endpoint, while snapshot (500) through (1000) is stored at the source endpoint).

A clustered network environment 100 that may implement one or more aspects of the techniques described and illustrated herein is shown in FIG. 1. In particular, the clustered network environment 100 may comprise nodes 106(1)-106(n) capable of accessing a remote object store 136 over a network. The nodes 106(1)-106(n) is implemented as servers, containers hosted within a container orchestration platform (e.g., Kubernetes), serverless threads, virtual machines, or other hardware or software. The nodes 106(1)-106(n) are configured to backup snapshots to endpoints within the remote object store 136. An endpoint may relate to a storage bucket or other storage access point of the remote object store 136 where the nodes 106(1)-106(n) can transmit API calls (e.g., representation state transfer (REST) API calls) to perform storage operations such as to back up a snapshot into a storage bucket of the endpoint.

In some embodiments, the object store 136 is a storage environment hosted by a $3^{rd}$ party cloud storage provider (e.g., AWS, Azure, etc.). The storage environment may comprise storage buckets within which objects are stored. These objects are created by the nodes 106(1)-106(n) to comprise snapshot data of snapshots being backed up to the storage environment. The nodes 106(1)-106(n) transmit these objects to an endpoint of the remote object store 136 for storage within that endpoint (e.g., within a storage bucket of the endpoint). In some embodiments, an endpoint may comprise a storage bucket in the storage environment of the $3^{rd}$ party cloud storage provider, on-premise storage (e.g., primary storage used by a node or storage system (e.g., locally attached or network attached storage devices managed by the node or storage system, such as a data storage node attached to a disk module of a node (e.g., data storage device 110(1) attached to disk module 116(1) of node 106(1)) to store and host a volume being backed up as the snapshots), an on-premise node, disk storage, memory, or any other storage location or device within which snapshots or other data may be stored. The storage environment is comprised of storage devices hosted and maintained by the $3^{rd}$ party cloud storage provider. The storage environment is accessible to client devices, such as the nodes 106(1)-106(n), over a network. An endpoint of the storage environment may have a frontend with which the client devices interact. The frontend is configured to receive API calls transmitted by the nodes 106(1)-106(n) to the storage environment. The API calls correspond to various processing and functionality that the nodes 106(1)-106(n) are requesting from the storage environment to perform, such as storing objects within the storage environment. In this way, the $3^{rd}$ party cloud storage provider provides the nodes 106(1)-106(n) with storage through storage buckets of the storage environment as the object store 136 accessible through API calls transmitted over a network from client devices to the frontend of the storage environment. The $3^{rd}$ party cloud storage provider also provides compute, such as processor and memory resource, which is assigned to clients for use in hosting applications, websites, and services within virtual machines, containers, etc.

The nodes 106(1)-106(n) implement a snapshot copy process 109 that is capable of copying snapshots between endpoints within the remote object store 136, such as from a source storage bucket to a destination storage bucket. Operation of the snapshot copy process 109 is further described in relation to FIGS. 4, 5, and 6A-6B.

The clustered network environment 100 includes data storage apparatuses 102(1)-102(n) that are coupled over a cluster or cluster fabric 104 that includes one or more communication network(s) and facilitates communication between the data storage apparatuses 102(1)-102(n) (and one or more modules, components, etc. therein, such as, nodes 106(1)-106(n), for example), although any number of other elements or components can also be included in the clustered network environment 100 in other examples. This technology provides a number of advantages including methods, non-transitory computer readable media, and computing devices that implement the techniques described herein.

In this example, nodes 106(1)-106(n) can be primary or local storage controllers or secondary or remote storage controllers that provide client devices 108(1)-108(n) with access to data stored within data storage devices 110(1)-110(n) and cloud storage device(s) 136 (also referred to as remote object store). The nodes 106(1)-106(n) is implemented as hardware, software (e.g., a storage virtual machine), or combination thereof.

The data storage apparatuses 102(1)-102(n) and/or nodes 106(1)-106(n) of the examples described and illustrated herein are not limited to any particular geographic areas and can be clustered locally and/or remotely via a cloud network, or not clustered in other examples. Thus, in one example the data storage apparatuses 102(1)-102(n) and/or node 106(1)-106(n) can be distributed over a plurality of storage systems located in a plurality of geographic locations (e.g., located on-premise, located within a cloud computing environment, etc.); while in another example a clustered network can include data storage apparatuses 102(1)-102(n) and/or node 106(1)-106(n) residing in a same geographic location (e.g., in a single on-site rack).

In the illustrated example, one or more of the client devices 108(1)-108(n), which is, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) is general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The nodes 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint is stored within cloud storage device(s) 136 of the remote object store), etc., for example. Such nodes 106(1)-106(n) can be attached to the cluster fabric 104 at a connection point, redistribution point, or communication endpoint, for example. One or more of the nodes 106(1)-106(n) is capable of sending, receiving, and/or forwarding information over a network communications channel, and could comprise any type of device that meets any or all of these criteria.

In an example, the nodes 106(1) and 106(n) is configured according to a disaster recovery configuration whereby a surviving node provides switchover access to the storage devices 110(1)-110(n) in the event a disaster occurs at a disaster storage site (e.g., the node 106(1) provides client device 112(n) with switchover data access to data storage devices 110(n) in the event a disaster occurs at the second storage site). In other examples, the node 106(n) can be configured according to an archival configuration and/or the nodes 106(1)-106(n) can be configured based on another type of replication arrangement (e.g., to facilitate load sharing). Additionally, while two nodes are illustrated in FIG. 1, any number of nodes or data storage apparatuses can be included in other examples in other types of configurations or arrangements.

As illustrated in the clustered network environment 100, nodes 106(1)-106(n) can include various functional components that coordinate to provide a distributed storage architecture. For example, the nodes 106(1)-106(n) can include network modules 114(1)-114(n) and disk modules 116(1)-116(n). Network modules 114(1)-114(n) can be configured to allow the nodes 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node 106(1) can access the data storage device 110(n) by sending a request via the cluster fabric 104 through the disk module 116(n) of node 106(n) when the node 106(n) is available. Alternatively, when the node 106(n) fails, the network module 114(1) of node 106(1) can access the data storage device 110(n) directly via the cluster fabric 104. The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, SSDs, flash memory, or some other form of data storage, to the nodes 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on nodes 106(1)-106(n), the data storage devices 110(1)-110(n) can appear as locally attached. In this manner, different nodes 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there is a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 108(1)-108(n) can be networked with the nodes 106(1)-106(n) in the cluster, over the storage connections 112(1)-112(n). As an example, respective client devices 108(1)-108(n) that are networked to a cluster may request services (e.g., exchanging of information in the form of data packets) of nodes 106(1)-106(n) in the cluster, and the nodes 106(1)-106(n) can return results of the requested services to the client devices 108(1)-108(n). In one example, the client devices 108(1)-108(n) can exchange information with the network modules 114(1)-114(n) residing in the nodes 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that may reside in a hierarchical directory structure within the volumes 118(1)-118(n).

Volumes 118(1)-118(n) are typically configured in formats that is associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a filesystem is implemented that logically organizes the information as a hierarchical structure of directories and files. In this example, respective files are implemented as a set of disk blocks of a particular size that are configured to store information, whereas directories are implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes are a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs are characterized as constituting a virtual disk or drive upon which data within the virtual volumes are stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the nodes 106(1)-106(n) connects to a volume, a connection between the one of the nodes 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
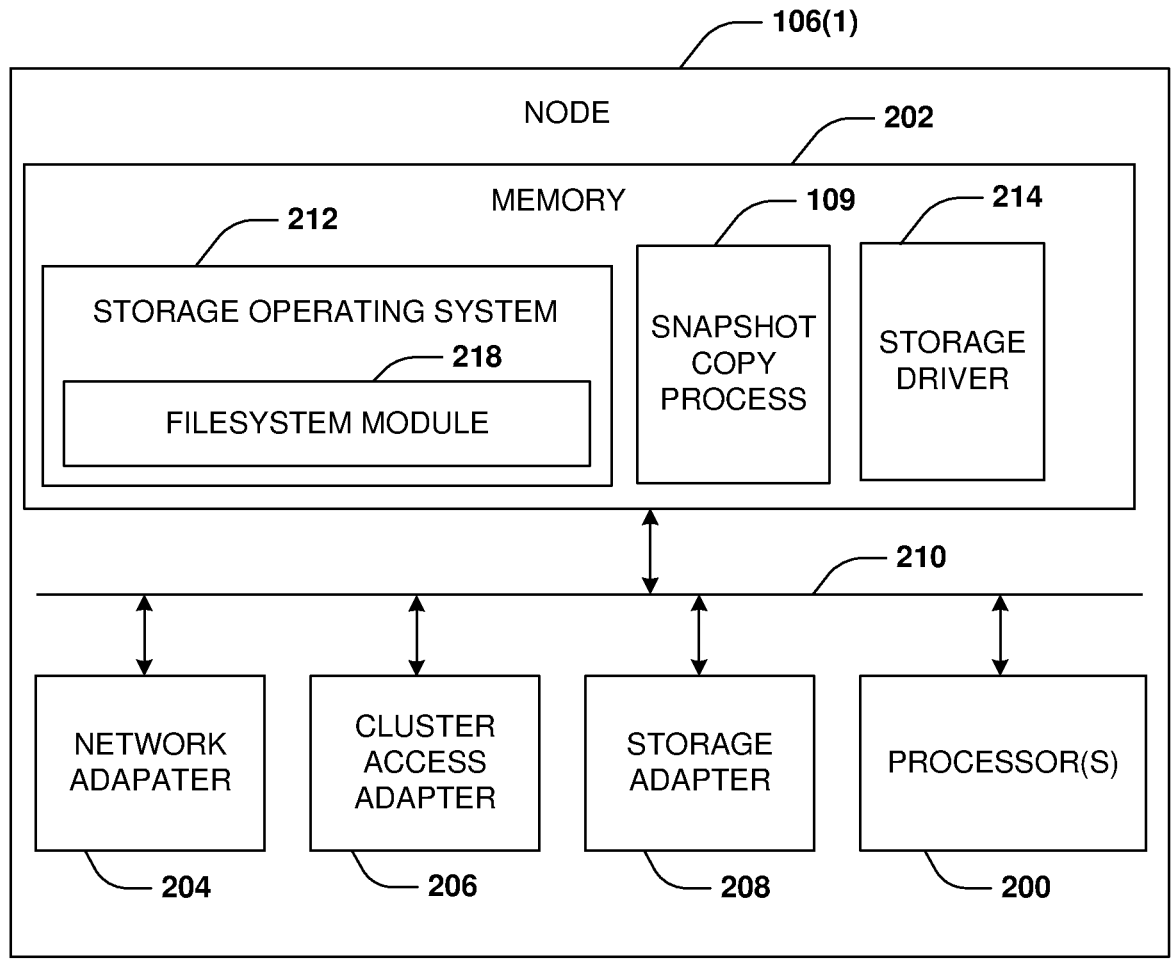
FIG. 2 is a block diagram illustrating a network environment with exemplary nodes.

Referring to FIG. 2, node 106(1) in this particular example includes processor(s) 200, a memory 202, a network adapter 204, a cluster access adapter 206, and a storage adapter 208 interconnected by a system bus 210. In other examples, the node 106(1) comprises a virtual machine, such as a virtual storage machine. The node 106(1) also includes a storage operating system 212 installed in the memory 202 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node 106(n) is substantially the same in structure and/or operation as node 106(1), although the node 106(n) can also include a different structure and/or operation in one or more aspects than the node 106(1).

The node 106(1) implements the snapshot copy process 109 that is capable of copying snapshots between endpoints within the remote object store 136, such as from a source storage bucket to a destination storage bucket. Operation of the snapshot copy process 109 is further described in relation to FIGS. 4, 5, and 6A-6B.

The network adapter 204 in this example includes the mechanical, electrical and signaling circuitry needed to connect the node 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) (not shown) with cloud storage device(s) 136 to process storage operations associated with data stored thereon.

The storage adapter 208 cooperates with the storage operating system 212 executing on the node 106(1) to access information requested by one of the client devices 108(1)-108(n) (e.g., to access data on a data storage device 110(1)-110(n) managed by a network storage controller). The information is stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node in the cluster) where the information is formatted into a data packet and returned to a requesting one of the client devices 108(1)-108(n) and/or sent to another node attached via the cluster fabric 104. In some examples, a storage driver 214 in the memory 202 interfaces with the storage adapter to facilitate interactions with the data storage devices 110(1)-110(n).

The storage operating system 212 can also manage communications for the node 106(1) among other devices that is in a clustered network, such as attached to a cluster fabric 104. Thus, the node 106(1) can respond to client device requests to manage data on one of the data storage devices 110(1)-110(n) or cloud storage device(s) 136 (e.g., or additional clustered devices) in accordance with the client device requests.

The file system module 218 of the storage operating system 212 can establish and manage one or more filesystems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a filesystem.

In the example node 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node 106(1). Other processing and memory mechanisms, including various computer readable media, is used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes a module configured to implement the techniques described herein, including for example atomic writes for persistent memory as discussed above and further below.

The examples of the technology described and illustrated herein is embodied as one or more non-transitory computer or machine readable media, such as the memory 202, having machine or processor-executable instructions stored thereon for one or more aspects of the present technology, which when executed by processor(s), such as processor(s) 200, cause the processor(s) to carry out the steps necessary to implement the methods of this technology, as described and illustrated with the examples herein. In some examples, the executable instructions are configured to perform one or more steps of a method described and illustrated later.

Figure 3:
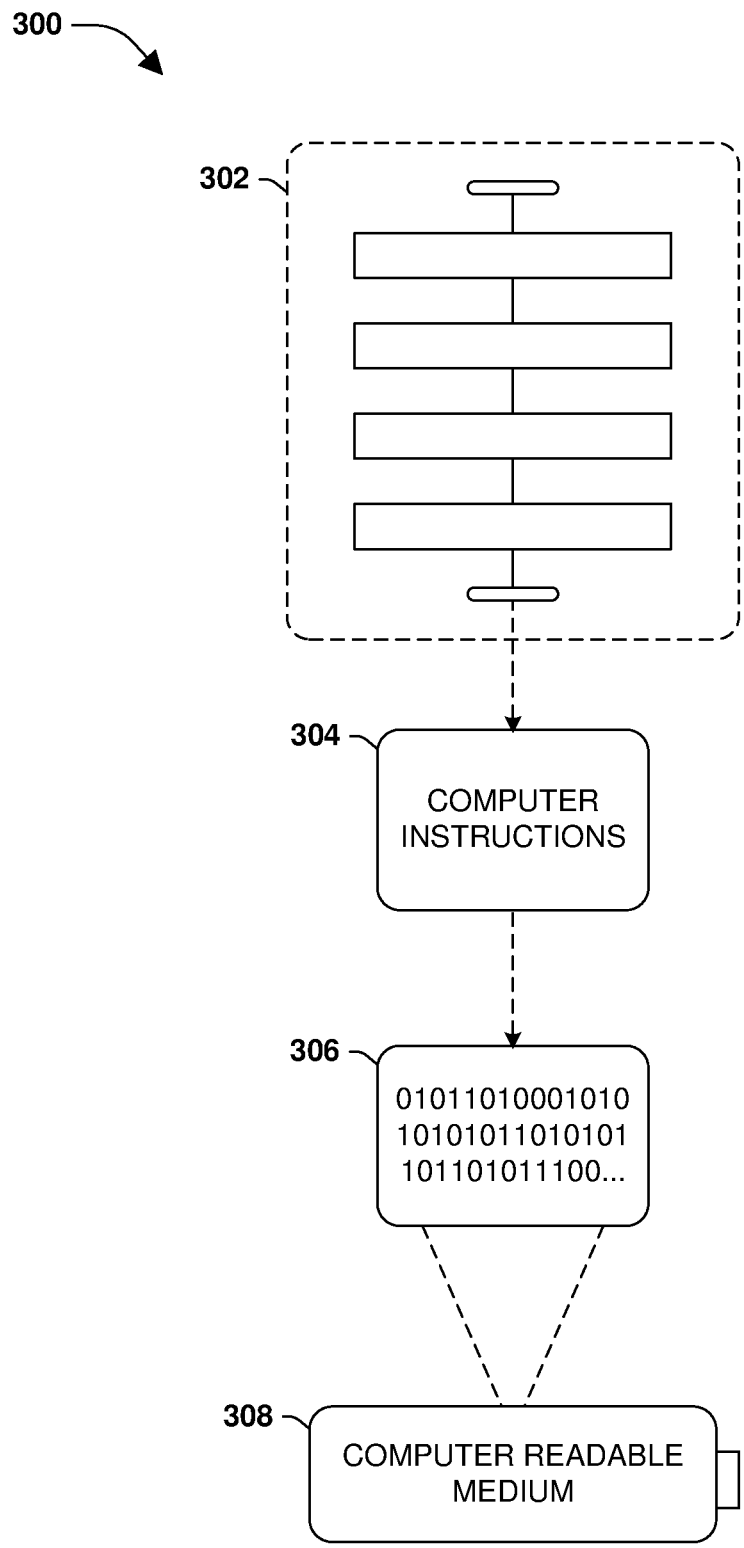
FIG. 3 is an example of a computer readable medium in which an embodiment of the invention is implemented.

In some embodiments, implementation of the snapshot copy process 109 involves a computer-readable medium 300 comprising processor-executable instructions configured to implement one or more of the techniques presented herein. An example embodiment of a computer-readable medium or a computer-readable device that is devised in these ways is illustrated in FIG. 3, wherein the implementation comprises a computer-readable medium 308, such as a compact disc-recordable (CD-R), a digital versatile disc-recordable (DVD-R), flash drive, a platter of a hard disk drive, etc., on which is encoded computer-readable data 306. This computer-readable data 306, such as binary data comprising at least one of a zero or a one, in turn comprises processor-executable computer instructions 304 configured to operate according to one or more of the principles set forth herein. In some embodiments, the processor-executable computer instructions 304 are configured to perform a method 302, such as at least some of the exemplary method 400 of FIG. 4, for example. In some embodiments, the processor-executable computer instructions 304 are configured to implement a system, such as at least some of the exemplary system 500 of FIG. 5 and/or at least some of the exemplary system 600 of FIGS. 6A and 6B, for example. Many such computer-readable media are contemplated to operate in accordance with the techniques presented herein.

Figure 4:
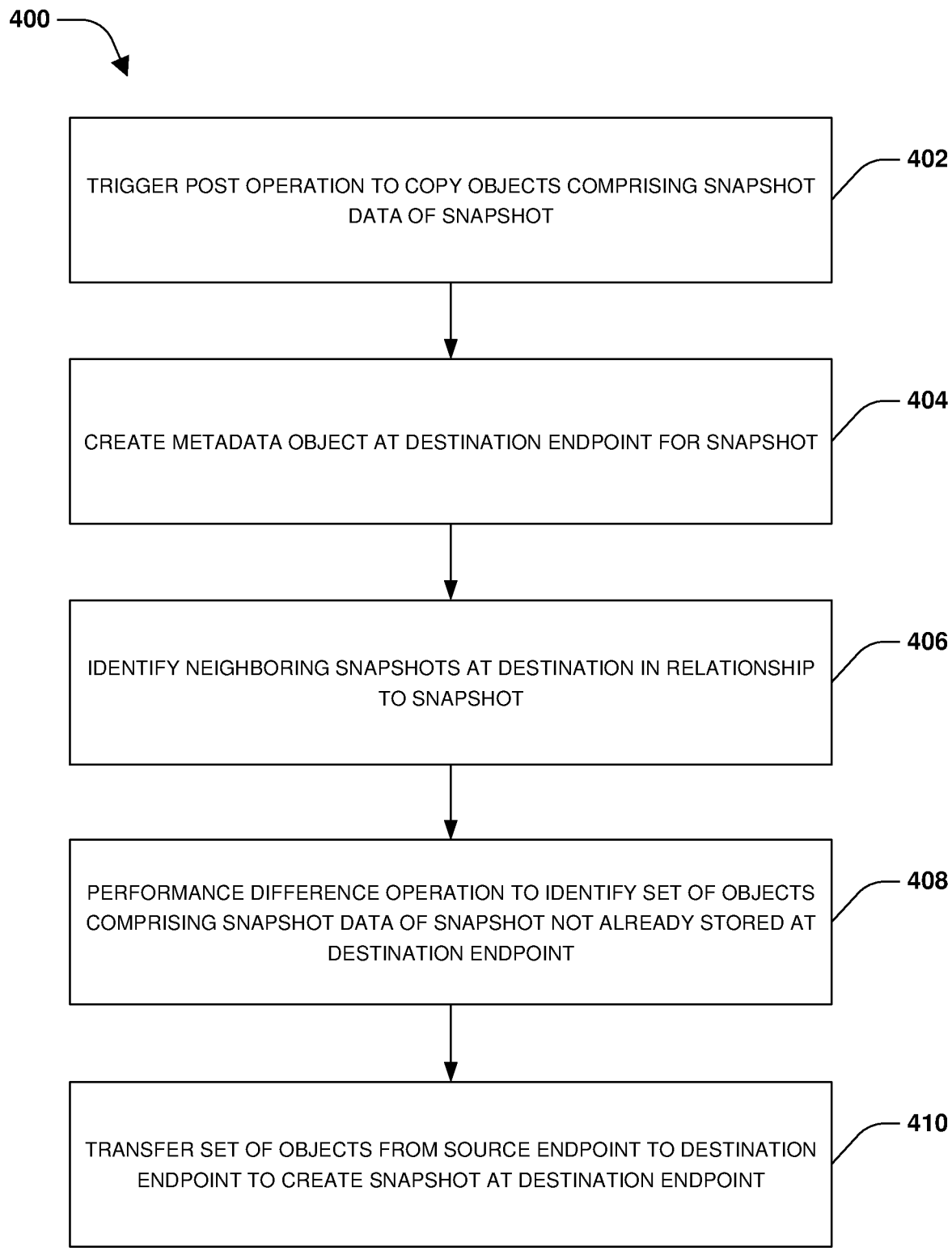
FIG. 4 is a flow chart illustrating an example method for implementing a snapshot copy operation between endpoints.
Figure 5:
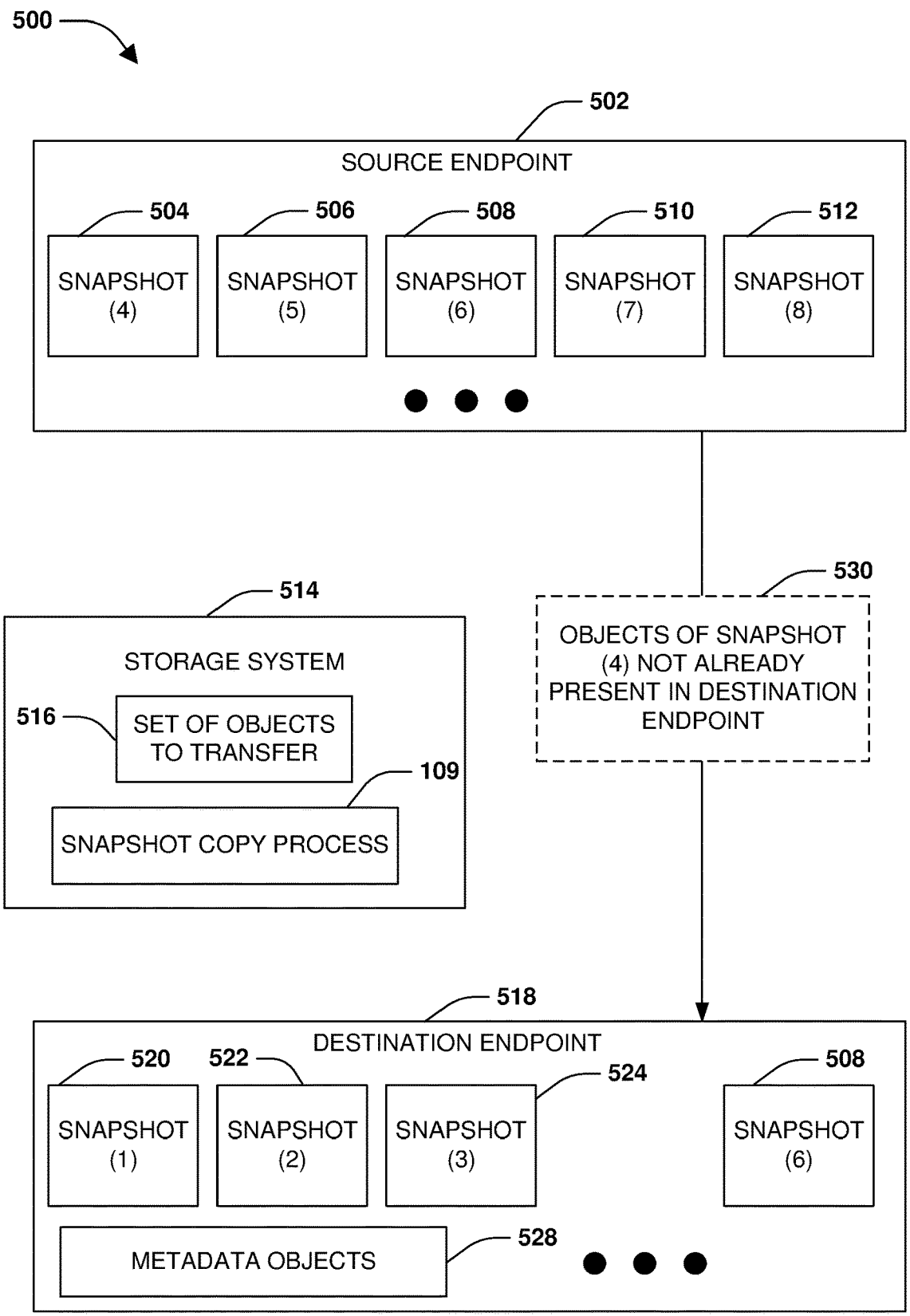
FIG. 5 is a block diagram illustrating an example system for implementing a snapshot copy operation between endpoints.
Figure 6A:
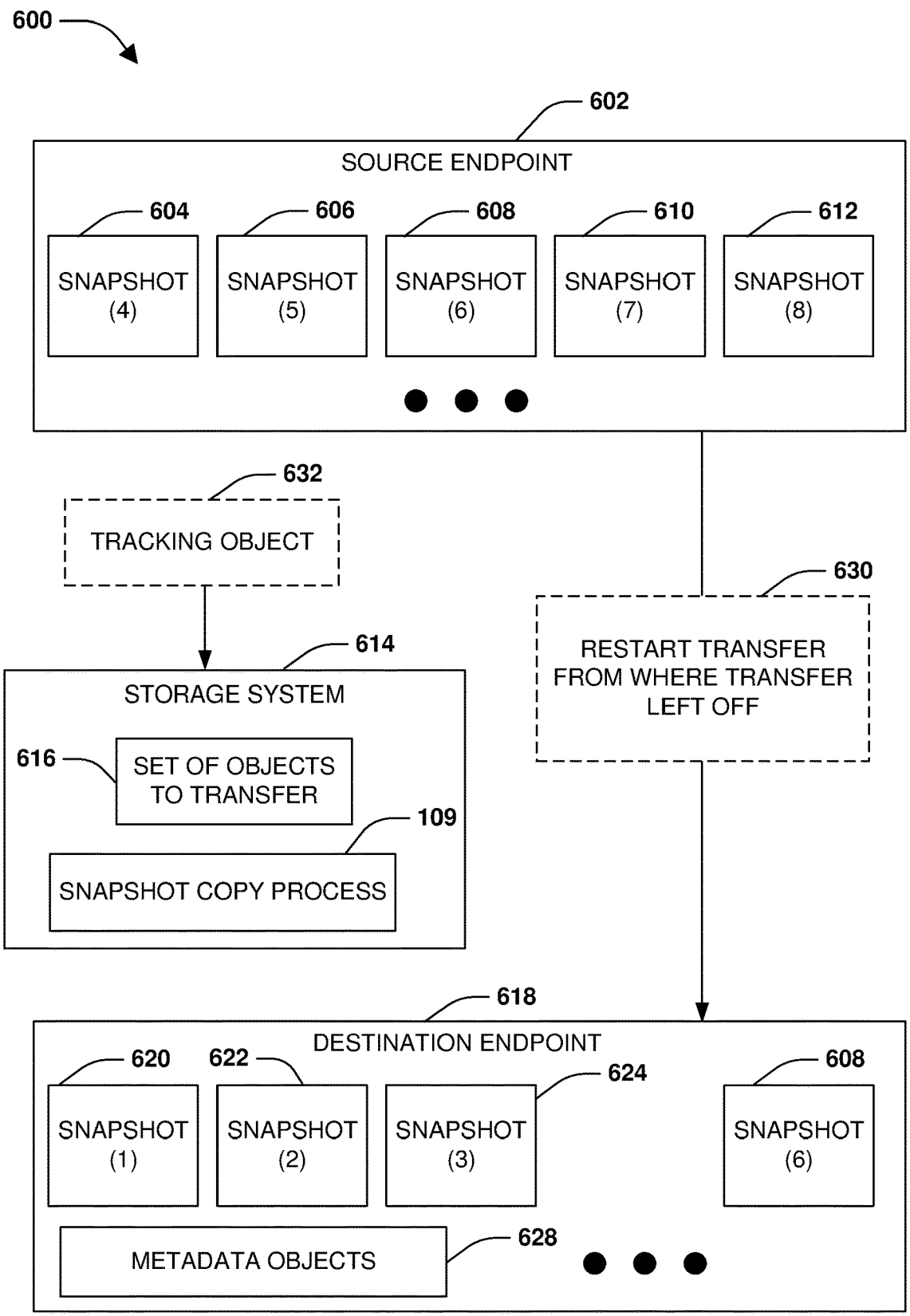
FIG. 6A is a block diagram illustrating an example system for implementing a snapshot copy operation between endpoints.
Figure 6B:
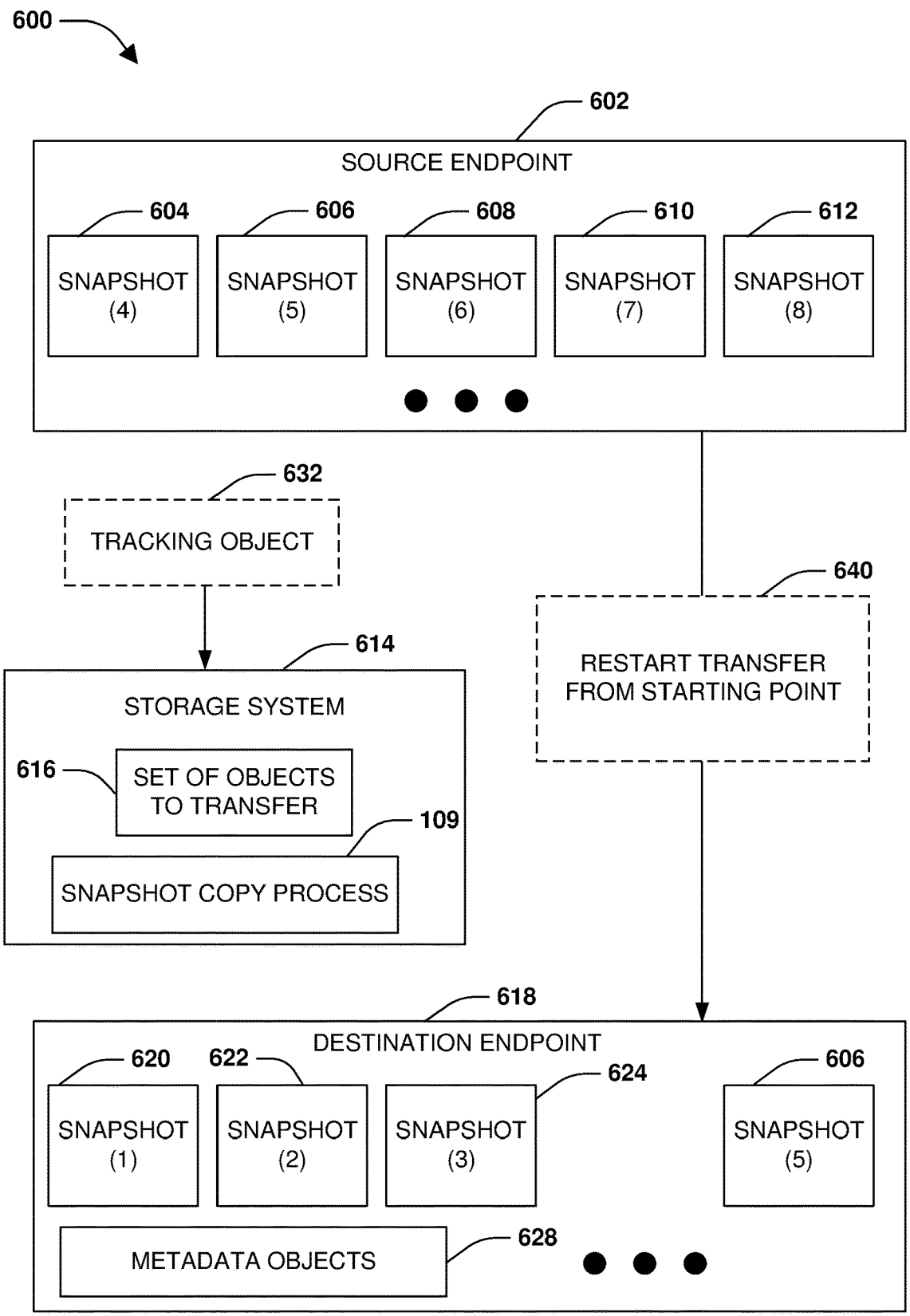
FIG. 6B is a block diagram illustrating an example system for implementing a snapshot copy operation between endpoints.

One embodiment of implementing a snapshot copy operation between endpoints is illustrated by an exemplary method 400 of FIG. 4, which is further described in conjunction with system 500 of FIG. 5 and/or system 600 of FIGS. 6A and 6B. Storage system 514 is configured to implement a snapshot copy process 109 configured to perform snapshot copy operations between a source endpoint 502 and a destination endpoint 518. The storage system 514 is implemented through a node, a server, a container hosted within a container orchestration platform such as Kubernetes, serverless threads, hardware, software, logical constructs, or combinations thereof. One or more snapshots are located at the source endpoint 502, such as a fourth snapshot 504, a fifth snapshot 506, a sixth snapshot 508, a seventh snapshot 510, an eighth snapshot 512, and/or other snapshots. One or more snapshots are located at the destination endpoint 518, such as a first snapshot 520, a second snapshot 522, a third snapshot 524, a sixth snapshot 508, and/or other snapshots. When a snapshot is located at an endpoint, all snapshot data of that snapshot is stored within objects located at the endpoint. In some embodiments, the source endpoint 502 and/or the destination endpoint 518 may correspond to storage buckets within an object store.

A request to copy a snapshot, such as the fourth snapshot 504, from the source endpoint 502 to the destination endpoint 518 is received by the snapshot copy process 109. In response to the request, the storage system 514 may implement a snapshot copy operation for the fourth snapshot 504. Accordingly, the storage system 514 may implement a post operation to copy objects comprising snapshot data of the snapshot from the source endpoint 502 to the destination endpoint 518, during operation 402 of method 400. Various stages are performed by the snapshot copy process 109 during the snapshot copy operation, such as an initialization stage, a metadata setup stage, a neighbor snapshot identification stage, a metadata object diffing stage, a copy stage, a copy done stage. During these stages, a snapshot state of the fourth snapshot 504 is maintained using a state machine or other tracking mechanism. The snapshot states may include a delete cleanup state indicating that a metadata object for the fourth snapshot 504 (e.g., a metadata object indicating which objects comprise snapshot data of the fourth snapshot 504; a root object; a snapinfo object; or other metadata or high level root objects of a tree structure used to represent the fourth snapshot 504 according to an object format) is to be created at the destination endpoint 518 as part of metadata objects 528 maintained at the destination endpoint 518. The snapshot states include a deleted sate indicating that the metadata object has been created at the destination endpoint 518. The snapshot states include a transferred state indicating that the copying of the fourth snapshot 504 to the destination endpoint 518 is complete. If the fourth snapshot 504 is the first snapshot being copied to the destination endpoint 518 (e.g., a first time the fourth snapshot 504 is being copied to the destination endpoint), then there is no existing state information at the destination endpoint 518.

During operation 404 of method 400, the storage system 514 creates a metadata object for the fourth snapshot 504 the destination endpoint 518 as part of the metadata objects 528 maintained at the destination endpoint 518. Before the metadata object is created, an initialization state is performed to set the snapshot state of the fourth snapshot 504 to a cleanup delete state. The metadata object comprises indicators (e.g., bits of a bitmap such as an object map) indicating which snapshots comprise snapshot data of the fourth snapshot 504. In some embodiments, the metadata object is copied from the source endpoint 502 to the destination endpoint 518. In some embodiments, if root and snapshot metadata objects (e.g., a rel root and snapinfo objects) for the fourth snapshot 504 do not exist at the destination endpoint 518, then the root and snapshot metadata objects are constructed at the destination endpoint 518. The root and snapshot metadata objects may depend upon what objects and/or snapshots are at the destination endpoint 518, and thus these objects are created as opposed to being copied form the source endpoint 502. In this way, the metadata setup stage is complete, and a snapshot state of the fourth snapshot 504 is transitioned from a cleanup delete state to a deleted state.

During operation 406 of method 400, the snapshot copy process 109 of the storage system 514 identifies neighboring snapshots at the destination endpoint 518 in relation to the fourth snapshot 504. The neighboring snapshots are identified during the neighbor snapshot identification stage. The neighboring snapshots are identified based upon sequence numbers assigned to the fourth snapshot 504 and other snapshots within the destination endpoint 518. In particular, snapshots are assigned monotonically increasing sequence numbers that can be used to determine an ordering with which the snapshots were created. A snapshot with a next largest sequence number than the fourth snapshot 504 is identified as a next neighboring snapshot, such as the sixth snapshot 508 that is assigned a sequence number of 6 that is the next largest sequence number from the sequence number of 4 of the fourth snapshot 504. A snapshot with a next smallest sequence number than the fourth snapshot 504 is identified as a previously neighboring snapshot, such as the third snapshot 524 that is assigned a sequence number of 3 that is the next smallest sequence number from the sequence number of 4 of the fourth snapshot 504. There is instances where there is no previous neighboring snapshot, or there is a previous neighboring snapshot but no next neighboring snapshot, or there is no previous neighboring snapshot and no next neighboring snapshot. These instances are handled during a subsequent metadata object diffing stage.

During operation 408 of method 400, the snapshot copy process 109 of the storage system 514 implements a difference scanner to perform a difference operation during the metadata object diffing stage in order to identify a set of objects 516 comprising snapshot data of the fourth snapshot 504 that are not already present at the destination endpoint 518. These objects include snapshot data of the fourth snapshot 504, but not snapshot data of the neighboring snapshots (the third snapshot 524 and the sixth snapshots 508) because these objects would already be located at the destination endpoint 518. In some embodiments, the difference scanner is executed to compare indicators within the metadata object of the fourth snapshot 504 with corresponding indicators within metadata objects of the neighboring snapshots (the third snapshot 524 and the sixth snapshots 508). Each metadata object comprises indicators (e.g., bits within a bitmap) that can be set to indicate whether objects comprise snapshot data of a snapshot or not. The set of objects 516 is represented by indicators within the metadata object for the fourth snapshot 504 as comprising snapshot data of the fourth snapshot and represented by corresponding indicators within the metadata objects for the neighboring snapshots (the third snapshot 524 and the sixth snapshots 508) as not comprising snapshot data of the neighboring snapshots.

In some embodiments, if the previous neighboring snapshot exists and the next neighbor snapshot does not exist (e.g., the third snapshot 524 has the highest sequence number and there is no sixth snapshot 508 at the destination endpoint 518), then the difference scanner is configured according to a first scanner type that utilizes a null object metadata object with indicators set of null of the next neighboring snapshot. If the previous neighboring snapshot does not exist and the next neighboring snapshot does exist (e.g., the fourth snapshot 504 has the lowest sequence number and there is no first, second, or third snapshot at the destination endpoint 518), then the difference scanner is configured according to a last scanner type that utilizes a null object metadata object with indicators set of null of the previous neighboring snapshot. If both the previous neighboring snapshot and the next neighboring snapshot do not exist (e.g., the fourth snapshot 504 is the first snapshot being transferred to the destination endpoint 518), then the scanner is configured according to a read scanner type that reads the indicators of the metadata object of the fourth snapshot 504 to identify the set of objects 516 as objects identified as comprising snapshot data of the fourth snapshot 504. In this way, the set of objects, comprising snapshot data of the fourth snapshot 504 and not already located at the destination endpoint 518, to transfer from the source endpoint 502 to the destination endpoint 518 is identified.

During operation 410 of method 400, the set of objects 516 comprising the snapshot data of the fourth snapshot 504 and not already present in the destination endpoint 518 is transferred 530 from the source endpoint 502 to the destination endpoint 518 by the snapshot copy process 109 during a copy stage. Get operations are performed against the source endpoint 502 to get the objects, and put operations are performed against the destination endpoint 518 to put the objects into the destination endpoint 518. In some embodiments, the set of objects 516 is transferred 530 in an unordered manner from the source endpoint 502 to the destination endpoint 518. In some embodiment, a plurality of serverless worker threads are implemented to transfer batches of objects in parallel (e.g., transfer 100 objects in parallel). In some embodiments, the set of objects 516 is transferred the source endpoint 502 to the destination endpoint 518 within an object store while retaining the set of objects 516 within the object store and without removing the set of objects 516 from the object store (e.g., without download the set of objects 516 from the source endpoint 502 to the storage system 514 and then uploading the set of objects 516 from the storage system 514 to the destination endpoint 518). For example, the set of objects 516 is transferred from the source endpoint 502 within one object store to the destination endpoint 518 within another remote object store, wherein an actual copy of the set of objects 516 is performed efficiently by a cloud provider to avoid a copy application from reading and writing the set of objects 516 and incurring IO and network backpressure due to quality of service (QoS) reservations Once the set of objects 516 have been successfully transferred 530, the fourth snapshot 504 at the source endpoint 502 is validated. During a copy done stage, the fourth snapshot 504 is validated if the fourth snapshot 504 has a transferred state, and is invalidated if the fourth snapshot 504 has a different state. If the fourth snapshot 504 at the source endpoint 502 is validated, then a state of the fourth snapshot 504 copied to the destination endpoint 518 is set of a transferred state to indicate successful completion of the snapshot copy operation. Otherwise, the snapshot copy operation is not yet deemed to be successful and further reconciliation and/or synchronization of the fourth snapshot 504 between the source endpoint 502 and the destination endpoint 518 is performed.

In some embodiments, progress of a snapshot copy operation is tracked within a tracking object that is used by the snapshot copy process 109 to resume the snapshot copy operation from a checkpoint, which is further described in relation to FIGS. 6A and 6B. FIG. 6A illustrates a source endpoint 602 comprising a fourth snapshot 604, a fifth snapshot 606, a sixth snapshot 608, a seven snapshot 610, and an eighth snapshot 612. A destination endpoint 618 comprises a first snapshot 620, a second snapshot 622, a third snapshot 624, a sixth snapshot, and metadata objects 628 of the snapshots at the destination endpoint 618 and/or of the fourth snapshot 604 being copied by the storage system from the source endpoint 602 to the destination endpoint 618 using a snapshot copy operation. As the snapshot copy operation is being performed by the snapshot copy process 109 of a storage system 614 to transfer a set of objects 616, comprising snapshot data of the fourth snapshot 604 and not already located at the destination endpoint 618, from the source endpoint 602 to the destination endpoint 618, a tracking object 632 (e.g., a cookie) is used to track progress of the snapshot copy operation. In some embodiments, a get operation is performed during the snapshot copy operation in order to obtain progress information (e.g., identification of what objects or a latest object of the set of objects 616 copied to the destination endpoint 618) relating to the copying of the set of objects 616 to the destination endpoint 618. The progress information is used to update the tracking object 632.

In some embodiments, the tracking object 632 is populated with information corresponding to the neighboring snapshots of the fourth snapshot 504, such as the third snapshot 624 and the sixth snapshot 608 located at the destination endpoint 618. In some embodiments, the information may correspond to a hash associated with the copying the fourth snapshot 604 from the source endpoint 602 to the destination endpoint 618, such as a hash derived from the neighboring snapshots of the fourth snapshot 604, such as the third snapshot 624 and the sixth snapshot 608 located at the destination endpoint 618. In some embodiments, the snapshot copy operation may fail, be paused, or is terminated before the entirety of the set of objects 616 have been transferred. A restart request comprising the tracking object 632 is received. The tracking object 632 is verified such as by verifying using the hash within the tracking object 632. If the verification of the hash indicates that the previous neighboring snapshots used during the snapshot copy operation are still the current neighboring snapshots, then the transfer 630 is started from where the snapshot copy operation left off, as illustrated by FIG. 6A. If the verification of the hash indicates that the previous neighboring snapshots used during the snapshot copy operation are not still the current neighboring snapshots (e.g., the sixth snapshot 608 is no longer the next neighboring snapshot, but the fifth snapshot 606 is not the next neighboring snapshot located at the destination endpoint 618 and has a next largest sequence number compared to the fourth snapshot 604), then the transfer 640 is started from a beginning point. In this way, the snapshot copy operation may either be safely resumed from where the snapshot copy operation left off or is restarted from the beginning point.

Figure 7A:
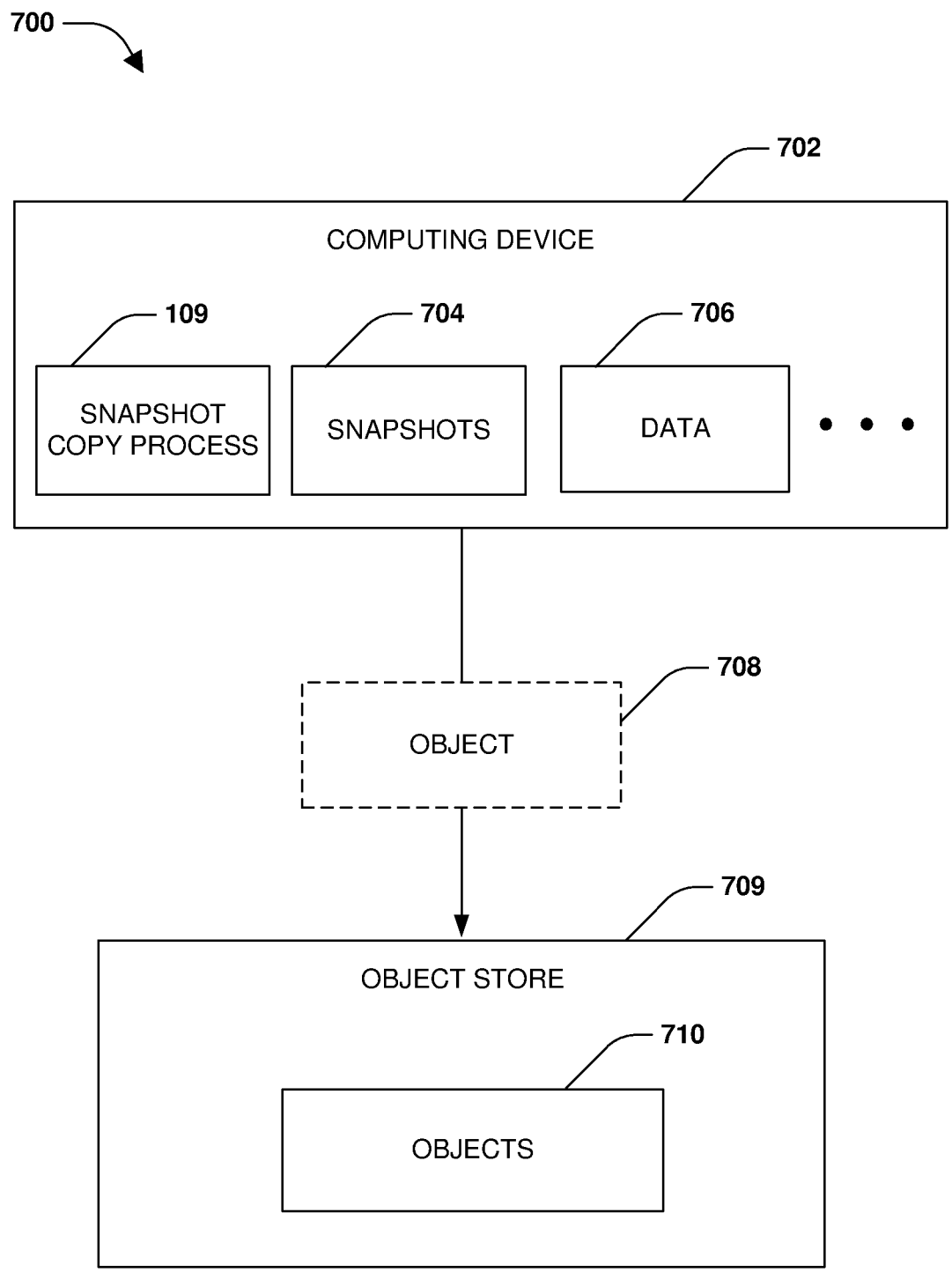
FIG. 7A is a component block diagram illustrating an example system for managing objects within an object store using an object file system.

FIG. 7A illustrates a system 700 for managing objects within an object store (a remote object store) using an object file system. The objects may store backup data of snapshots that can be restored on-demand to an on-demand volume using a restore process (e.g., an on-demand restore operation) such that clients are provided with access to the backup data during and before completion of the restore process. A computing device 702 may comprise a node, a storage controller, a storage service, an on-premises computing device, a storage virtual machine, or any other hardware or software. The computing device 702 may store data 706 within storage devices (primary storage) managed by the computing device 702. The computing device 702 may provide client devices with access to the data 706, such as by processing read and write operations from the client devices. The computing device 702 may create snapshots 704 of the data 706, such as a snapshot of a file system of a volume accessible to the client devices through the computing device 702. The computing device 702 is configured to communicate with an object store 709 over a network. The object store 709 may comprise a cloud computing environment remote to the computing device 702.

As provided herein, an object file system and object format is provided for storing and accessing data, such as snapshots, stored within objects in the object store 709. The data 706, maintained by the computing device, is stored into a plurality of slots of an object 708. Each slot represents a base unit of data of the object file system defined for the object store 709. For example, the object 708 comprises or any other number of slots (e.g., 1024 slots), wherein each slot comprises 7kb of data or any other amount of data. It is appreciated that objects may comprise any number of slots of any size. User data, directory blocks, metadata, and/or inofile blocks of an inofile comprising per inode metadata is stored into the slots of the object 708. In an example, snapshot data, of a snapshot created by the computing device 702 of a file system maintained by the computing device 702, is stored into the object 708. For example, the object 708 is maintained as an independent logical representation of the snapshot, such that data of the snapshot is accessible through the object 708 without having to reference other logical copies of other snapshots stored within objects 710 of the object store 709. In an example, the data is converted from physical data into a version independent format for storage within the object 708.

In an example, the object 708 is created to comprise data in a compressed state corresponding to compression of the data within the primary storage of the computing device 702. In this way, compression used by the computing device 702 to store the data is retained within the object 708 for storage within the object store 709. The object 708 is assigned a unique sequence number. Each object within the object store 709 is assigned unique sequence numbers.

An object header is created for the object 708. The object header comprises a slot context for slots within the object 708. The slot context may comprise information relating to a type of compression used for compressing data within the object 708 (if any compression is used), a start offset of a slot, a logical data length, a compressed data length, etc. The slot context is used to access compressed data stored within the object 708.

Figure 7B:
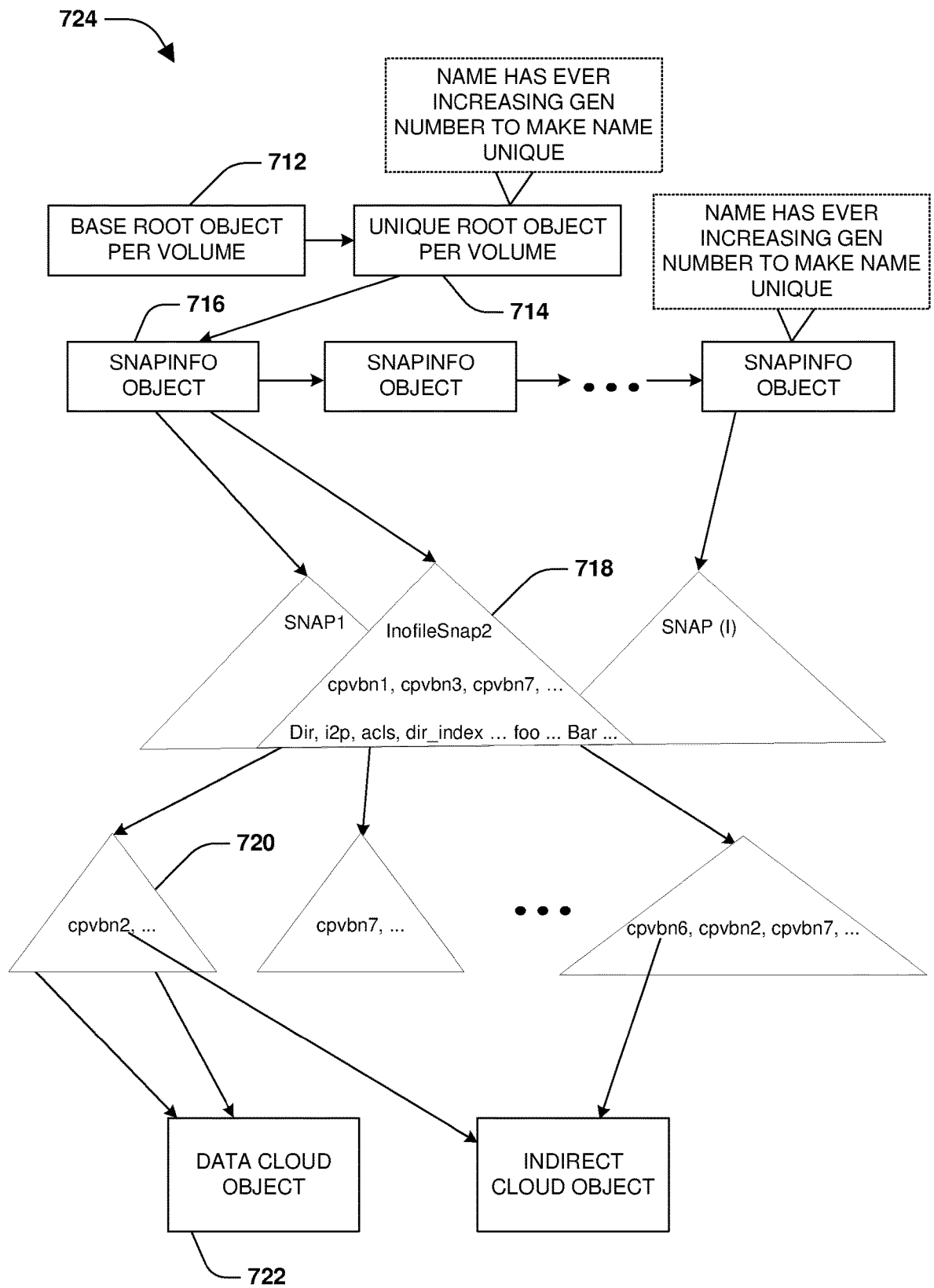
FIG. 7B is an example of a snapshot file system within an object store.
Figure 7C:
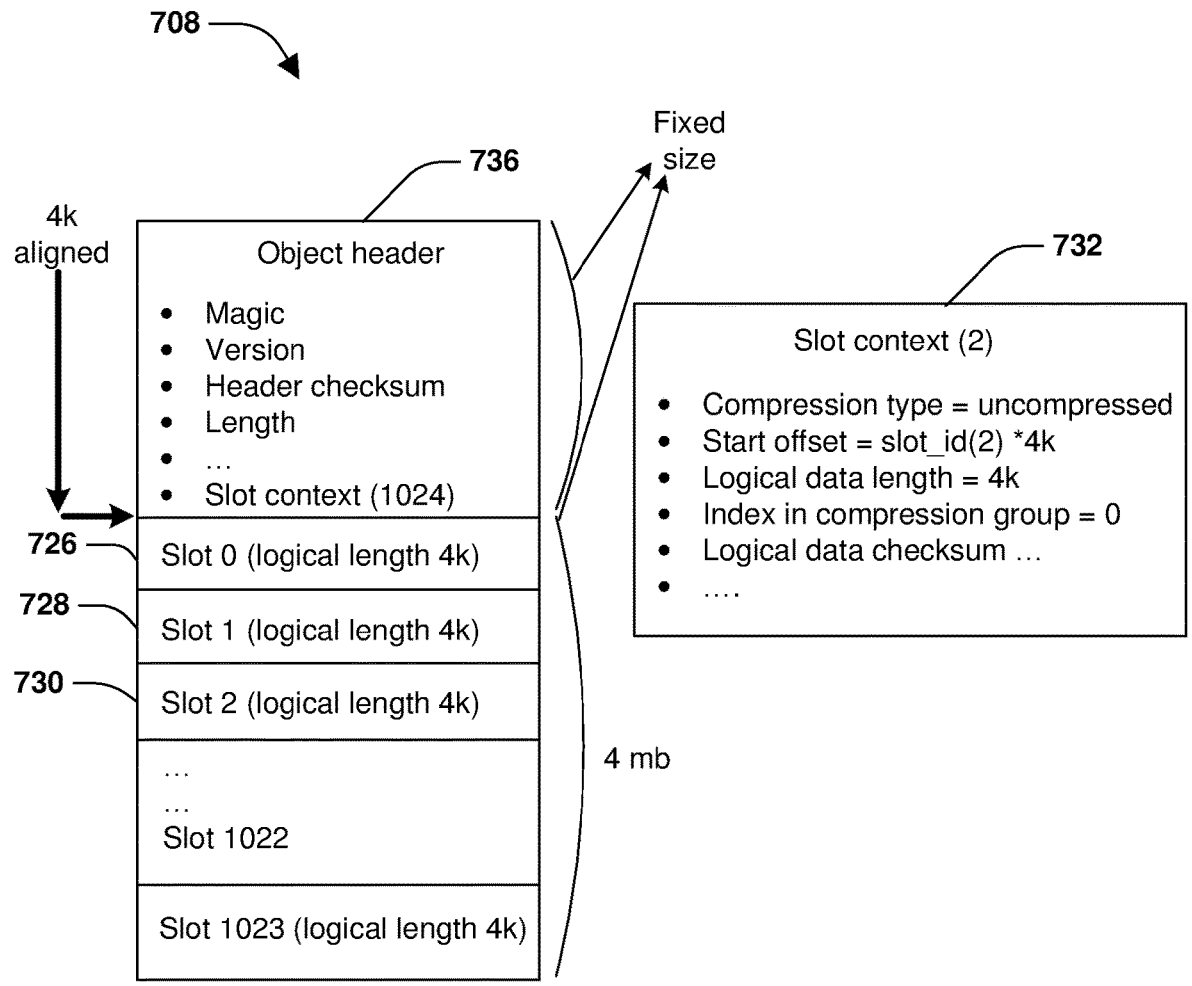
FIG. 7C is an example of an object stored within an object store.

FIG. 7C illustrates an example of the object 708. The object 708 comprises an object header 736 and a plurality of slots, such as a slot 726, a slot 728, a slot 730, and/or any other number of slots. The object header 736 may have a size that is aligned with a start of the plurality of slots, such as having a 7 kb alignment based upon each slot having a logical length of 7 kb. It is appreciated that slots may have any length. The object header 736 comprises various information, such as a version identifier, a header checksum, a length of the object 708, a slot context 732, and/or other information used to access and manage data populated into the slots of the object 708.

The slot context 732 comprises various information about the slots, such as a compression type of a slot (e.g., a type of compression used to compress data of slots into a compression group or an indicator that the slot does not comprise compressed data), a start offset of the slot within the object 708 (e.g., a slot identifier multiplied by a slot size, such as 7 kb), a logical data length of the slot (e.g., 7 kb), a compressed length (e.g., 0 if uncompressed), an index of the slot within a compression group of multiple slots (e.g., 0 if uncompressed), a logical data checksum, etc.

The data stored within the slots of the object 708 are represented as a data structure (e.g., a structure that is traversable by a data connector component). The data structure may comprise a tree structure or any other type of structure. For example, the data structure comprises the tree structure representing a file. The data structure is populated with a plurality of nodes at various levels of the tree structure. The nodes are represented by cloud block numbers. A cloud block number of a node may comprise a sequence number used to uniquely identify the object 708 and/or a slot number of a slot comprising a portion of the data represented by the node. User data, directory blocks, metadata, inofile blocks of an inofile, and/or other data stored within the slots of the object 708 is represented by nodes within the data structure. In an example, user data is stored within leaf nodes of the data structure (e.g., nodes within a level 0 (L0) level of the tree structure). Pointers (indirects) is stored within non-leaf nodes of the data structure (e.g., nodes within a level 1(L1), a level 2 (L2), and/or other levels of the tree structure). An inode object for the file may comprise pointers that point to non-leaf nodes within a top level of the data structure.

In an example of the tree structure, a 1 TB file is represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 7B illustrates a snapshot file system of data structures 724 (e.g., a tree structure that can be traversed by a data connector component) used to represent snapshots (e.g., snapshots of one or more volumes managed by the computing device 702) stored into the objects 710 of the object store 709. There is one base root object per volume, such as a base root object 712 for a volume of which the snapshots were captured. There is a unique root object per volume, such as a unique root object 714 for the volume. The base root object 712 may point to the unique root object 714. Names of the unique root objects are derived from increasing generation numbers. The unique root object 714 may point to snapinfo objects, such as a snapinfo object 716 comprising information regarding one or more snapshots, such as a pointer to an inofile 718 of a second snapshot of the volume. The inofile 718 comprises cloud block numbers of slots within an object comprising data of the second snapshot, such as a pointer to an indirect 720 that points to data 722 of the snapshot. The inofile 718 may comprise or point to information relating to directories, access control lists, and/or other information.

A mapping metafile (a VMAP) is maintained for the object 708. The mapping metafile maps block numbers of primary storage of the computing device 702 (e.g., virtual volume block numbers of the data stored into slots of the object 708) to cloud block numbers of nodes representing portions of the data stored within the slots of the object 708. The object 708 is stored within the object store 709. In an example of storing objects into the object store 709, the plurality of snapshots 704, maintained by the computing device 702, are stored within objects 710 of the object store 709. Each snapshot is identifiable through a snapinfo object that has a unique generation number. As will be described later, the objects 710 within the object store 709 is deduplicated with respect to one another (e.g., the object 708 is deduplicated with respect to the object 710 using the mapping metafile as part of being stored into the object store 709) and retain compression used by the computing device 702 for storing the snapshots 704 within the primary storage.

The mapping metafile and/or the data structure are used to provide access through the object file system to portions of data within the slots of the object 708 in the object store 709. In an example, the inode object and the data structure are traversed to identify a sequence number and slot number of requested data. The sequence number and the slot number are used to access the requested data within a corresponding slot of the object 708. In an example, a read request targets a $100,000^{th}$ level 0 block stored within the object 708. The inode object is read to calculate which blocks in each level of the data structure will have 100,000 (e.g., $100,000/255$ is a 493th block in level 1 and 493/255 is a $2^{nd}$ block in level 2). These blocks are read at each level to go to a next level through appropriate pointers (e.g., cloud block numbers) until the data is read from a block of user data within the level 0. The pointers are cloud block numbers, where a pointer comprises a sequence number of the object 708 and a slot number. The sequence number corresponds to an object name of the object 708 and the slot number is which slot the data is located within the object 708.

In an embodiment, an on-demand restore of data within a snapshot stored within objects of the object store 709 can be performed to a target computing device using the mapping metafile and/or the data structure. In an embodiment, the mapping metafile and/or the data structure is used to free objects from the object store 709 based upon the objects comprising snapshot data of snapshots deleted by the computing device 702.

In an embodiment, the mapping metafile and/or an overflow mapping metafile are used to facilitate the copying of the snapshots to the object store 709 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 704 maintained by the computing device 702 and copied into the objects 710 of the object store 709 as copied snapshots. An entry within the mapping metafile is populated with a mapping between a block number of data within a snapshot at the computing device 702 (e.g., a virtual volume block number) and a cloud block number (e.g., a cloud physical volume block number) of a slot within an object into which the data was copied when the snapshot was copied to the object store 709 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry is populated with a logical length of an extent associated with the block number. The entry is populated with a physical length of the extent associated with the block number.

The mapping metafile and/or the overflow mapping metafile is indexed by block numbers of the primary storage (e.g., virtual volume block numbers of snapshots stored by the computing device 702 within the primary storage, which are copied to the object store as copied snapshots). In an example, the block numbers may correspond to virtual volume block numbers of data of the snapshots stored by the computing device 702 within the primary storage. In an example, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 702.

The mapping metafile and/or the overflow mapping metafile is used to determine what data of the current snapshot is to be copied to the object store 709 and what data already exists within the object store 709 so that only data not already within the object store 709 is transmitted to the object store 709 for storage within an object. Upon determining that the current snapshot is to be copied to the object store 709, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 709 and a prior copied snapshot already copied from the primary storage to the object store 709 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 709.

An object is created to store data of the deduplicated set of changed block numbers. The object comprises a plurality of slots, such as 1024 or any other number of slots. The data of the deduplicated set of changed block numbers are stored into the slots of the object. An object header is updated with metadata describing the slots. In an example, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 709 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 709. Once the object is stored within the object store 709, the mapping metafile and/or the overflow mapping metafile is updated with entries for the deduplicated set of changed block numbers based upon receiving an acknowledgment of the object being stored by the object store 709. An entry will map a changed block number to a cloud block number of a slot within which data of the changed block number is stored in the object.

In an embodiment, the object file system is used to provide various primary storage system services for the object store 709 in order to achieve efficient space and resource management, and flexible scaling in the object store 709 (e.g., a cloud computing environment). Additionally, pseudo read only snapshots are provided through the object store 709. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects are modified (e.g., a unit of storage within a cloud storage environment) without changing the meaning or accessibility of useable data in the objects (e.g., a cloud object comprising a snapshot copy of primary data maintained by the computing device 702). Objects are modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects are the correct data. The present system provides the ability to perform defragmentation and garbage collection for objects by a cloud service hosted by the object store 709, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 702, to the object store 709 such as cloud services within the cloud storage environment.

In one embodiment, objects within the object store 709 (e.g., objects within a cloud computing environment) can be maintained with a read only attribute such that data within objects can be overwritten/modified/freed so long as in-use data within the objects is not altered. In particular, an object is maintained within the object store 709, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 702 is storing data of a snapshot of a local file system within a slot of an object, and thus the snapshot data is in-use until a particular event occurs such as the computing device 702 deleting the snapshot). In an example, the object comprises snapshot data of a file system, a volume, a logical unit number (LUN), a file, or any other data of the computing device 702. In this way, the object comprises a read only snapshot of data of the computing device 702. In one example, a plurality of objects corresponding to read only snapshots of the file system of the computing device 702 are stored within the object store 709. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 702 (a primary storage system). For example, an in-use slot is a slot that comprises snapshot data (e.g., secondary/replicated data) of a snapshot created by a computing device 702. The slot becomes an unused slot when the data is no longer actively referenced, used, and/or maintained, such as where the computing device 702 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object is generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud computing environment. This will offload processing and resource utilization that would otherwise be used by the computing device 702 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by the computing device 702. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 709. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by the computing device 702. The snapshot is determined as being deleted by the computing device 702, and thus slots comprising snapshot data of the deleted snapshot are now considered to be unused slots as opposed to in-use slots.

Each snapshot of the file system is associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In an example, the garbage collection operation is executed by a cloud service in order to conserve resource consumption by the computing device 702 (primary storage system) otherwise used to execute the garbage collection operation. The garbage collection operation free objects from the object store 709 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 709 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 709. However, if the object is not unique to only deleted snapshot(s) such as where the object also stores data of an active/undeleted snapshot, then the object is not freed.

In an embodiment, defragmentation is provided for fragmented objects within the object store 709. In an example, defragmentation is implemented by a cloud service or application executing in the object store 709 in order to conserve resources otherwise used by a computing device 702 (primary storage system) that would execute defragmentation functionality. An object within the object store 709 is determined to be a fragmented object based upon the object comprising at least one freed slot from which data was freed. For example, a freed slot may comprise an unused slot comprising unused data no longer referenced/used by the computing device 702 (e.g., data of a deleted snapshot). Accordingly, the fragmented object may comprise one or more in-use slots of in-use data currently referenced/used by a computing device 702 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 709.

The present system preserves deduplication and compression used by the computing device 702 for snapshots when storing copied snapshots to the object store 709 notwithstanding copied snapshots representing fully logical copies of data in the primary storage of the computing device 702. In particular, deduplication is preserved because data that is shared in a snapshot (e.g., a local or primary snapshot created and maintain by the node) is also shared in a copied snapshot in the object store 709. Deduplication of compression groups is maintained while logically representing the compression groups in a copied snapshot. Block sharing across multiple snapshots is also preserved so that merely changed blocks are transferred/copied to the object store 709 during incremental snapshot transfers.

Additional compression is provided for a snapshot data copy. In particular, larger compression groups provide more space efficiency but with less read efficiency compared to smaller compression groups. Relatively smaller compression groups are used by the computing device 702 of the storage system since access to the primary storage of the computing device 702 is more read intensive, and thus read efficiency is prioritized over storage space efficiency. Because copied snapshots in the object store 709 are infrequently accessed (e.g., cold data that is infrequently read), relatively larger compression groups can be employed for improved storage space efficiency within the object store, which also reduces network bandwidth for snapshot copying to the object store 709.

In one embodiment, snapshots maintained by the computing device 702 are copied to the object store 709 as copied snapshots representing logical data of the snapshots. Data of the copied snapshots is stored into slots of objects that are deduplicated with respect to other objects stored within the object store 709 and retain compression used by the computing device 702 for the snapshots.

In an example, the computing device 702 stores data within primary storage. The computing device 702 may create snapshots of the data stored by the computing device 702. For example, the computing device 702 may create a snapshot of a file, a logical unit number, a directory, a volume, a storage virtual machine hosting a plurality of volumes, a file system, a consistency group of any arbitrary grouping of files, directories, or data, etc. The computing device 702 may deduplicate data between the snapshots so that instead of storing redundant data blocks multiple times, merely references are stored in place of the redundant data blocks and point to original data blocks with the same data. The computing device 702 may compress data within the snapshots, such as by creating compression groups of compressed data blocks.

The mapping metafile and/or the overflow mapping metafile is used to determine what data of the current snapshot is to be copied to the object store 709 and what data already exists within the object store so that only data not already within the object store is transmitted to the object store 709 for storage within an object. Upon determining that the current snapshot is to be copied to the object store, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

In an embodiment, the described methods and/or their equivalents is implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure is realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications is made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component is localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications is made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature is combined with one or more other features of the other implementations as is desired and advantageous for any given or particular application.

What is claimed is:

1. A method comprising:

storing snapshot data of snapshots into objects at a source endpoint within an object store of a cloud computing environment, wherein snapshot data of a snapshot is stored across a plurality of the objects, and wherein an object stores snapshot data shared by the snapshot and one or more neighboring snapshots of the snapshot;

creating a metadata object at a destination endpoint of the object store for a snapshot to copy from the source endpoint to the destination endpoint, wherein the metadata object comprises indicators set to indicate which of the objects comprise the snapshot data of the snapshot;

identifying a previous neighboring snapshot and a next neighboring snapshot, wherein objects at the destination endpoint store snapshot data of the previous neighboring snapshot and snapshot data of the next neighboring snapshot;

performing a difference operation upon the metadata object of the snapshot and metadata objects of the previous neighboring snapshot and the next neighboring snapshot to identify one or more objects, at the source endpoint, comprising snapshot data of the snapshot not already stored at the destination endpoint; and transferring the one or more objects from the source endpoint to the destination endpoint to create the snapshot at the destination endpoint, wherein a tracking object is created to track a transfer of the one or more objects and is populated with information derived from both the previous neighboring snapshot and the next neighboring snapshot, and wherein the information is verified to determine a starting point of the transfer.

2. The method of claim 1, wherein the transferring comprises:
transferring the one or more objects in an unordered manner from the source endpoint to the destination endpoint.

3. The method of claim 1, comprising:
maintaining the tracking object to track progress of copying the snapshot from the source endpoint to the destination endpoint.

4. The method of claim 1, comprising:
storing a hash associated with copying the snapshot from the source endpoint to the destination endpoint within the tracking object, wherein the hash corresponds to the previous neighboring snapshot and the next neighboring snapshot;
receiving a restart request comprising the tracking object;
verifying a validity of the tracking object using the hash;
determining that the hash indicates that the previous neighboring snapshot and the next neighboring snapshot at the destination endpoint are still the neighboring snapshots of the snapshot; and
restarting the transfer from a checkpoint tracked by the tracking object.

5. The method of claim 1, comprising:
storing a hash associated with copying the snapshot from the source endpoint to the destination endpoint within the tracking object, wherein the hash corresponds to the previous neighboring snapshot and the next neighboring snapshot;
receiving a restart request comprising the tracking object;
verifying a validity of the tracking object using the hash;
determining that the hash indicates that the previous neighboring snapshot and the next neighboring snapshot at the destination endpoint are not still the neighboring snapshots of the snapshot; and
restarting the transfer from a beginning point.

6. The method of claim 1, comprising:
populating the tracking object with a hash representing both the previous neighboring snapshot and the next neighboring snapshot.

7. The method of claim 1, comprising:
determining that root and snapshot metadata objects for the snapshot do not exist at the destination endpoint; and
creating the root and snapshot metadata objects at the destination endpoint.

8. The method of claim 1, comprising:
performing a get operation to obtain progress information relating to copying the one or more objects from the source endpoint to the destination endpoint.

9. The method of claim 1, comprising:
performing a get operation to obtain progress information relating to copying the one or more objects from the source endpoint to the destination endpoint; and
updating a tracking object with the progress information.

10. The method of claim 1, comprising:
maintaining a snapshot state using a state machine including a delete cleanup state indicating that the metadata object is to be created at the destination endpoint, a deleted state indicating that the metadata object has been created at the destination endpoint, and a transferred state indicating copy of the snapshot is complete.

11. The method of claim 1, comprising:
determining that the previous neighboring snapshot exists and the next neighboring snapshot does not exist; and
configuring a difference scanner according to a first scanner type to utilize a null object metadata object with indicators set to null for the next neighboring snapshot.

12. The method of claim 1, comprising:
determining that the previous neighboring snapshot does not exist and the next neighboring snapshot exists; and
configuring a difference scanner according to a last scanner type to utilize a null object metadata object with indicators set to null for the previous neighboring snapshot.

13. The method of claim 1, comprising:
determining that the previous neighboring snapshot does not exist and the next neighboring snapshot does not exist; and
configuring a difference scanner according to a read scanner type to identifies the one or more objects based upon indicators within metadata object.

14. A computing device comprising:
a memory comprising machine executable code; and
a processor coupled to the memory, the processor configured to execute the machine executable code to cause the processor to:
store snapshot data of snapshots into objects at a source endpoint within an object store of a cloud computing environment, wherein snapshot data of a snapshot is stored across a plurality of the objects, and wherein an object stores snapshot data shared by the snapshot and one or more neighboring snapshots of the snapshot;
create a metadata object at a destination endpoint of the object store for a snapshot to copy from the source endpoint to the destination endpoint, wherein the metadata object comprises indicators set to indicate which of the objects comprise the snapshot data of the snapshot;
identify a previous neighboring snapshot and a next neighboring snapshot, wherein objects at the destination endpoint store snapshot data of the previous neighboring snapshot and snapshot data of the next neighboring snapshot;
perform a difference operation upon the metadata object of the snapshot and metadata objects of the previous neighboring snapshot and the next neighboring snapshot to identify one or more objects, at the source endpoint, comprising snapshot data of the snapshot not already stored at the destination endpoint; and
transfer the one or more objects from the source endpoint to the destination endpoint to create the snapshot at the destination endpoint, wherein a tracking object is created to track a transfer of the one or more objects and is populated with information derived from both the previous neighboring snapshot and the next neighboring snapshot, and wherein the information is verified to determine a starting point of the transfer.

15. The computing device of claim 14, wherein the machine executable code causes the processor to:
perform a get operation to obtain progress information relating to copying the one or more objects from the source endpoint to the destination endpoint.

16. The computing device of claim 14, wherein the machine executable code causes the processor to:
execute a difference scanner to compare indicators within the metadata object of the snapshot with corresponding indicators within the metadata objects of the neighboring snapshots to identify the one or more objects based upon the one or more objects being represented by indicators within the metadata object that are set to indicate that the one or more objects comprise the snapshot data of the snapshot and being represented by corresponding indicators within the metadata objects of the neighboring snapshots that are set to indicate that the one or more objects do not comprise snapshot data of the neighboring snapshots.

17. The computing device of claim 14, wherein the machine executable code causes the processor to:
change a snapshot state to a transferred state based upon the one or more objects being transferred to the destination endpoint and a successful validation check that the snapshot at the source endpoint is valid.

18. The computing device of claim 14, wherein the machine executable code causes the processor to:
transferring the one or more objects from the source endpoint to the destination endpoint, wherein an actual copy of the one or more objects is performed efficiently by a cloud provider to avoid a copy application from reading and writing the one or more objects and incurring IO and network backpressure due to quality of service (QOS) reservations.

19. A non-transitory machine readable medium comprising instructions for performing a method, which when executed by a machine, causes the machine to:
store snapshot data of snapshots into objects at a source endpoint within an object store of a cloud computing environment, wherein snapshot data of a snapshot is stored across a plurality of the objects, and wherein an object stores snapshot data shared by the snapshot and one or more neighboring snapshots of the snapshot;
create a metadata object at a destination endpoint of the object store for a snapshot to copy from the source endpoint to the destination endpoint, wherein the metadata object comprises indicators set to indicate which of the objects comprise the snapshot data of the snapshot;
identify a previous neighboring snapshot and a next neighboring snapshot, wherein objects at the destination endpoint store snapshot data of the previous neighboring snapshot and snapshot data of the next neighboring snapshot;
perform a difference operation upon the metadata object of the snapshot and metadata objects of the previous neighboring snapshot and the next neighboring snapshot to identify one or more objects, at the source endpoint, comprising snapshot data of the snapshot not already stored at the destination endpoint; and
transfer the one or more objects from the source endpoint to the destination endpoint to create the snapshot at the destination endpoint, wherein a tracking object is created to track a transfer of the one or more objects and is populated with information derived from both the previous neighboring snapshot and the next neighboring snapshot, and wherein the information is verified to determine a starting point of the transfer.

20. The non-transitory machine readable medium of claim 19, wherein the instructions cause the machine to:
transfer the one or more objects in batches, wherein objects within a batch are transferred in parallel.

* * * * *